United States Patent
Pallagatti Kotrabasappa et al.

(10) Patent No.: US 12,170,622 B2
(45) Date of Patent: *Dec. 17, 2024

(54) NETWORK RESOURCE SELECTION FOR FLOWS USING FLOW CLASSIFICATION

(71) Applicant: VMware LLC, Palo Alto, CA (US)

(72) Inventors: Santosh Pallagatti Kotrabasappa, Bangalore (IN); Sairam Veeraswamy, Bangalore (IN); Abhishek Goliya, Pune (IN); Abbas Mohamed, Bangalore (IN)

(73) Assignee: VMware LLC, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/358,864

(22) Filed: Jul. 25, 2023

(65) Prior Publication Data
US 2023/0370386 A1    Nov. 16, 2023

Related U.S. Application Data

(63) Continuation of application No. 17/019,083, filed on Sep. 11, 2020, now Pat. No. 11,711,307.

(30) Foreign Application Priority Data

Jul. 3, 2020    (IN) .............................. 202041028376

(51) Int. Cl.
*H04L 47/10* (2022.01)
*G06F 16/245* (2019.01)
(Continued)

(52) U.S. Cl.
CPC ........ *H04L 47/2441* (2013.01); *G06F 16/245* (2019.01); *G06N 20/00* (2019.01)

(58) Field of Classification Search
CPC .......... G06F 16/245; G06N 3/02; G06N 3/08; G06N 20/00; H04L 45/08; H04L 45/123;
(Continued)

(56) References Cited

U.S. PATENT DOCUMENTS 9,921,991 B2    3/2018 Yu et al.
2015/0071072 A1    3/2015 Ratzin et al.
(Continued)

OTHER PUBLICATIONS

Zhang et al, Efficient flow detection and scheduling for SDN-based big data centers, Springer, 12 pages, Apr. 26, 2018.*
(Continued)

*Primary Examiner* — Frank Duong
(74) *Attorney, Agent, or Firm* — King Intellectual Asset Management

(57) ABSTRACT

In some embodiments, a method receives a set of packets for a flow and determines a set of features for the flow from the set of packets. A classification of an elephant flow or a mice flow is selected based on the set of features. The classification is selected before assigning the flow to a network resource in a plurality of network resources. The method assigns the flow to a network resource in the plurality of network resources based on the classification for the flow and a set of classifications for flows currently assigned to the plurality of network resources. Then, the method sends the set of packets for the flow using the assigned network resource.

20 Claims, 10 Drawing Sheets

(51) Int. Cl.
*G06N 20/00* (2019.01)
*H04L 47/2441* (2022.01)

(58) Field of Classification Search
CPC ....... H04L 45/306; H04L 45/74; H04L 47/18;
H04L 47/2441; H04L 47/803; H04L
69/16; H04L 69/22
See application file for complete search history.

(56) References Cited

U.S. PATENT DOCUMENTS

| | | | | |
|---|---|---|---|---|
| 2016/0105364 | A1* | 4/2016 | Kanonakis | H04L 47/10 370/235 |
| 2019/0190838 | A1 | 6/2019 | Shpiner et al. | |
| 2019/0222499 | A1* | 7/2019 | Chen | G06F 18/24155 |
| 2019/0386913 | A1* | 12/2019 | Wei | H04L 47/125 |
| 2020/0169509 | A1 | 5/2020 | Tigl | |

OTHER PUBLICATIONS

Pascal Poupart et al., "Online Flow Size Prediction for Improved Network Routing", 2016 Proceedings IEEE, 2016, 6 pages.
Majd Latah et al, "Application of Artificial Intelligence to Software Defined Networking: A Survey", Indian Journal of Science and Technology, vol. 9(44), DOI: 10.17485/ijst/2016/v9i44/89812, Nov. 2016, 7 pages.
Raouf Boutaba et al., "A comprehensive survey on machine learning for networking: evolution, applications and research opportunities", Journal of Internet Services and Applications, 2018, downloaded Jul. 2, 2020, 99 pages.
Mowei Wang et al, "Machine Learning for Networking: Workflow, Advances and Opportunities", IEEE Network, 2017, downloaded Jul. 2, 2020, 8 pages.
Nandita Dukkipati et al, "Why flow-Completion Time Is the Right metric for Congestion Control and why this means we need new algorithms", ACM SIGCOMM Computer Communication Review, 36(1):59-62, 2006. Stanford, CA, 8 pages.
The MAWI, MAWI Working Group Traffic Archive, downloaded from //mawi.wide.ad.jp/mawi/ on Jul. 2, 2020.
Mohammad Al-Fares et al., "Hedera: Dynamic Flow Scheduling for Data Center Networks", In NSDI, vol. 10, 2010, downloaded July 2. 2020, 15 pages.
Nathan Farrington et al. "A Hybrid Electrical/Optical Switch Architecture for Modular Data Centers". SIGCOMM'10, Aug. 30-Sep. 3, 2010, 12 pages.
Chhabra et al., Classifying Elephant and Mice Flows in High-Speed Scientific Networks, INDIS, 8 pages, Sep. 19, 2017.
Liu et al., An adaptive approach for elephant flow detection with the rapidly changing traffic in data center network, WILEY, 13 pages, Jun. 2017.
Xiao et al., An Efficient Elephant Flow Detection with Cost-Sensitive in SDN, ICST, 5 pages, Mar. 2015.
Trestian et al., Mice Trap: Scalable Traffic Engineering of Datacenter Mice Flows using OpenFlow, IEEE, 4 pages, 2013.

* cited by examiner

NETWORK RESOURCE SELECTION FOR FLOWS USING FLOW CLASSIFICATION

RELATED APPLICATIONS

This application is a continuation of U.S. patent application Ser. No. 17/019,083, filed Sep. 11, 2020, entitled "NETWORK RESOURCE SELECTION FOR FLOWS USING FLOW CLASSIFICATION", which benefit is claimed under 35 U.S.C. 119(a)-(d) to Foreign Application Serial No. 202041028376 filed in India entitled "NETWORK RESOURCE SELECTION FOR FLOWS USING FLOW CLASSIFICATION", on Jul. 3, 2020, by VMware, Inc., which are herein incorporated in their entireties by reference for all purposes.

BACKGROUND

The increase in the use of data centers has resulted in an increase in the number of links and paths between nodes to transfer network traffic. In networks, the flow of packets can be distributed equally using equal length paths across the network. For example, equal cost multi-path routing (ECMP) may be used where packet forwarding to a single destination can occur over multiple paths and the flows may be distributed equally across the paths. However, some flows may transfer more network traffic (e.g., bandwidth) than average, which results in a congested path in the network. The congested path may contain a variety of packets of different sizes and the time the flows are present and active in the path may vary considerably. The flows that are larger sized may stay inside the paths for a longer duration and transfer more data, which may cause delay in the network for that duration. In some solutions, the larger type flows inside the network may be detected after the flows have completed. However, detecting the flows that are causing the delay to the network for a long duration after these flows complete may not be useful to prevent the current delays being experienced in the network.

BRIEF DESCRIPTION OF THE DRAWINGS

With respect to the discussion to follow and in particular to the drawings, it is stressed that the particulars shown represent examples for purposes of illustrative discussion, and are presented in the cause of providing a description of principles and conceptual aspects of the present disclosure. In this regard, no attempt is made to show implementation details beyond what is needed for a fundamental understanding of the present disclosure. The discussion to follow, in conjunction with the drawings, makes apparent to those of skill in the art how embodiments in accordance with the present disclosure may be practiced. Similar or same reference numbers may be used to identify or otherwise refer to similar or same elements in the various drawings and supporting descriptions. In the accompanying drawings.

DETAILED DESCRIPTION

Figure 1A:
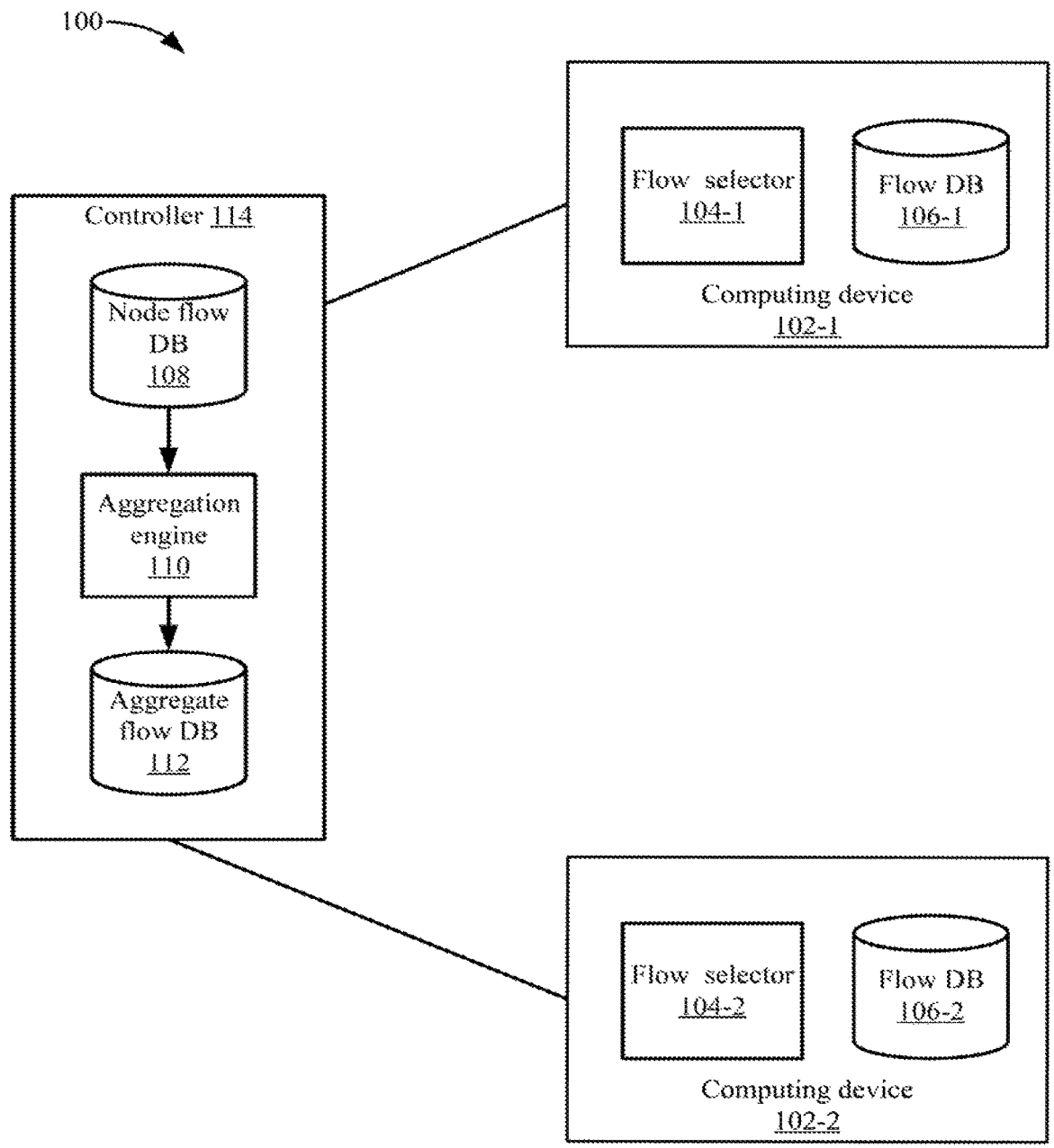
FIG. 1A depicts a simplified system for performing flow based network resource selection according to some embodiments.

In the following description, for purposes of explanation, numerous examples and specific details are set forth in order to provide a thorough understanding of embodiments of the present disclosure. Some embodiments as expressed in the claims may include some or all of the features in these examples, alone or in combination with other features described below, and may further include modifications and equivalents of the features and concepts described herein. Note that some explanations herein, may reflect a common interpretation or abstraction of actual processing mechanisms. Some descriptions may abstract away complexity and explain higher level operations without burdening the reader with unnecessary technical details of well understood mechanisms. Such abstractions in the descriptions herein should be construed as inclusive of the well understood mechanisms.

A flow selector may perform network resource selection to assign a flow to a network resource out of multiple possible network resources based on characteristics of the flow. In the network resource selection process, the flow selector identifies a flow type for a flow and then can assign the flow to a network resource based on the flow type. The identification of the flow type occurs before network resource assignment to allow the flow selector to use the flow type when assigning a flow to a network resource. The flows may be classified in multiple types, such as a first classification and a second classification. The first classification may be referred to as an elephant flow and the second classification may be referred to as a mice flow. Elephant flows have characteristics in which a large amount of data is sent over a long duration in an active state. For example, the elephant flows may contain packets of different sizes and the flows are in the kilobyte range to gigabyte range with a duration that may be from minutes to hours. Mice flows may send a small amount of data for a very short duration (e.g., milliseconds) and do not stay as active as elephant flows in sending packets through the flow. For example, mice flows may send packets with a small amount of data and the connection may be torn down after a short time.

The flow selector may classify a flow using a process that analyzes characteristics of the flow. In some embodiments, a machine-learning algorithm is used to classify a flow as a mice flow or an elephant flow. Using the classification, the flow selector may assign a network resource to the flow based on the characteristics of flows already assigned to respective network resources. In some embodiments, the flow selector may assign weights to the network resources based on the elephant flows and mice flows that are currently assigned to each respective network resource. The weights may be any type of value that is determined based on the elephant flows and mice flows that are currently assigned to each respective network resource. Then, the flow selector may assign the flow based on the classification of the flow and the current weights of the network resources. In some embodiments, the flow selector attempts to assign an elephant flow on a network resource that has a lower weight, such as the least weight (e.g., may be less probably congested), and assign a mice flow on a network resource that may have a higher weight, but does not have the highest weight (e.g., may be more probably congested). However, other configurations may be appreciated, such as mice flows may be assigned to less congested links if the flow is latency sensitive.

System Overview

Flow based network resource selection may be used in different systems. In the different systems, the network resources that are assigned to flows may be different; however, the process of using elephant and mice flows to select the network resources using a weighted network resource selection process may be similar. Although some systems are described below, the flow based network resource selection process may be implemented in other systems.

FIG. 1A depicts a simplified system 100 for performing flow based network resource selection according to some embodiments. Computing devices 102-1 and 102-2 (collectively computing device(s) 102) may be physical or virtual computing devices that perform processing of network traffic (e.g., packets) being sent on a network. Computing devices 102 includes hardware resources including computer processor resources (not shown) memory resources (not shown) and input/output resources, including physical network interfaces (PNICs") (not shown). More detailed network resources of computing devices 102 are described below.

Computing devices 102 include flow selectors 104-1 and 104-2 (collectively flow selector(s) 104) that perform flow based network resource selection to assign a flow to a network resource out of multiple network resources. A flow may be identified by a source (not shown) and a destination (not shown). When the flow can be processed by multiple network resources, flow selector 104 selects one of the network resources to process the flow.

Flow selector 104 may assign a flow to a network resource based on characteristics of the flow and the characteristics of flows currently assigned to network resources. As discussed above, the possible classifications include as an elephant flow or a mice flow. After determining the classification, flow selector 104 uses the classification to assign a network resource to the flow. In some embodiments, flow selector 104 uses a weighted network resource selection process that weights the available network resources based on existing flow classifications. Depending on the weights of the network resources and the classification of the flow, flow selector 104 assigns the flow to a network resource. Accordingly, flow selector 104 may more intelligently assign flows to network resources compared to an equal cost load balancing process. For example, a first network resource may have mostly mice flows assigned to it and a second network resource may have multiple elephant flows assigned to it. If the flow is an elephant flow, flow selector 104 may assign the elephant flow to the first network resource because this network resource has less elephant flows assigned to it and may be less congested. Similarly, if the flow is a mice flow, flow selector 104 may not assign the flow to the network resource that is least congested, but may assign the flow to a network resource that is more congested because the mice flow is unlikely to be transferring a large amount of bandwidth. Flow selector 104 may determine the classification for a flow (e.g., elephant or mice classification) before assigning the flow to a network resource. This allows flow selector 104 to use the classification of the flow to assign the flow to a network resource, but may require some buffering of packets that are received. However, because reassigning flows to other network resources after assigning the flow to a network resource may cause problems, buffering of some packets allows the flow to be initially assigned to a network resource that may better balance network traffic among the network resources. Once the assignment is made, computing device 102 may send the buffered packets using the network resource.

Flow selector 104 may determine a classification for a flow by generating a new classification for a flow or by using a previously determined flow classification. When generating a new classification for a flow, flow selector 104 may use a machine-learning process to classify the flow as an elephant flow or a mice flow, but other types of processes may be used including rule based processes. Using the machine learning process may allow flow selector 104 to predict a classification of a flow.

When using a previously generated classification, flow selector 104 may use classifications based on specific flows and aggregated flows. A flow database (DB) 106 may identify the classifications based on the specific flows and the aggregated flows. Flow database 106 may be stored in local memory in computing device 102, but flow database 102 may be located elsewhere, such as in a connected database or in a controller 114.

A specific flow may be identified by source and destination information. In some examples, the source and destination information may include a 5-tuple, which includes a source address, a source port, a destination address, a destination port, and a protocol, but other combinations of source and destination information may be used. Specific flows may be reused when a source and a destination end their connection, but then reopen another connection, which may have the same source and destination information.

Each computing device 102 may store the specific flows in a flow database 106. Flow database 106 may identify specific flows and their classifications that were previously classified by only that specific computing device 102. In other examples, flow database 106 may identify specific flows and their classifications that were previously classified by other computing devices 102. When a specific flow is encountered again, flow selector 104 can look the classification for the specific flow up in flow database 106 to determine the classification. Then, flow selector 104 may not need to classify the specific flow again. However, in some embodiments, flow selector 104 could check whether the characteristics of the flow have changed over time by generating a new classification. If the new classification is different, flow selector 104 may remove the specific flow from flow database 106 and/or use the new classification.

Flow selector 104 may also use the concept of an aggregated flow, which may be a classification that is identified by destination information, but not source information. In some embodiments, a controller 114 may generate an aggregated flow because controller 114 is coupled to multiple computing devices 102. Controller 114 is shown as being separate from computing devices 102, but other devices may be used to generate the aggregated flows. For example, controller 114 may be located anywhere in the network and comprise a cluster or distributed set of processes running on a plurality of physical or virtual computers, which may or may not include computing devices 102. The aggregated flow may identify the flow using destination information and not source information, such as by using a 3-tuple that includes the destination address, the destination port, and the protocol. The aggregated flow may collect classifications from multiple computing devices 102 for flows that match the 3-tuple and determine the aggregated classification based on the aggregated information.

To generate the aggregated flow and associated aggregated flow classification, flow selectors 104 from multiple computing devices 102 may send classifications to controller 114 when the classifications are generated by flow selector 104. A node flow database (DB) 108 stores classifications for specific flows that are received from computing devices 102. Then, an aggregation engine 110 may determine an aggregated flow classification for an aggregated flow. In node flow database 108, there may be multiple specific flows from different sources, but to the same destination. Aggregation engine 110 may determine the classifications for the flows that have the same destination. Although the source may be different for the flows, it is possible that the destination may be handling the same types of flows. For example, a video server may be serving video to multiple different sources and the flows associated with the video server may have similar characteristics, such as the flows may typically be elephant flows. The process of determining whether flows should be aggregated for a classification will be described in more detail below.

Once aggregation engine 110 determines the aggregated flow classification, aggregation engine 110 can store the aggregated flow classification in aggregate flow database (DB) 112. Controller 114 can also send the aggregated flow classifications, or a subset thereof that are relevant to computing devices 102, to flow database 106. As discussed above, flow database 106 may also store classifications for specific flows that have already been identified by flow selector 104. These specific flows are identified by the 5-tuple instead of the 3-tuple for aggregated flows. Flow classifications in flow database 106 may be accessed by or communicated to flow selector 104.

Flow selector 104 may use the specific flow or the aggregated flow classifications to perform network resource selection in the future. For example, instead of generating a new classification to classify a flow, flow selector 104 may use the classification of the specific flow in flow database 106 to perform network resource selection if there is a match of the source and the destination for a new flow. Similarly, flow selector 104 may use the aggregated flow in flow database 106 to perform network resource selection for a flow that has the same destination as the aggregated flow.

The following describes different examples of implementing flow selector 104, but other implementations may be appreciated. For example, flow selector 104 may be used in different scenarios, such as at the routing level, an uplink level, and at the application level. For the routing level, when a network is reachable via multiple links, the flow selector may assign a flow to a link based on characteristics of the flow. The different links may have different next hops, which all can be used to reach a destination. In the uplink level, uplinks may be associated with physical network interfaces (PNICs). Flow selector 104 may assign a flow to an uplink based on characteristics of the flow. Also, when an uplink is coupled to multiple PNICs, a flow selector 104 in a NIC teaming device may select a PNIC to process the flow for the uplink. At the application level, an advanced load balancer may select a network resource out of multiple network resources to process a flow. For example, the advanced load balancer may load balance flows over multiple web server service network resources that can process web traffic.

Flow Selection in a Site

Figure 1B:
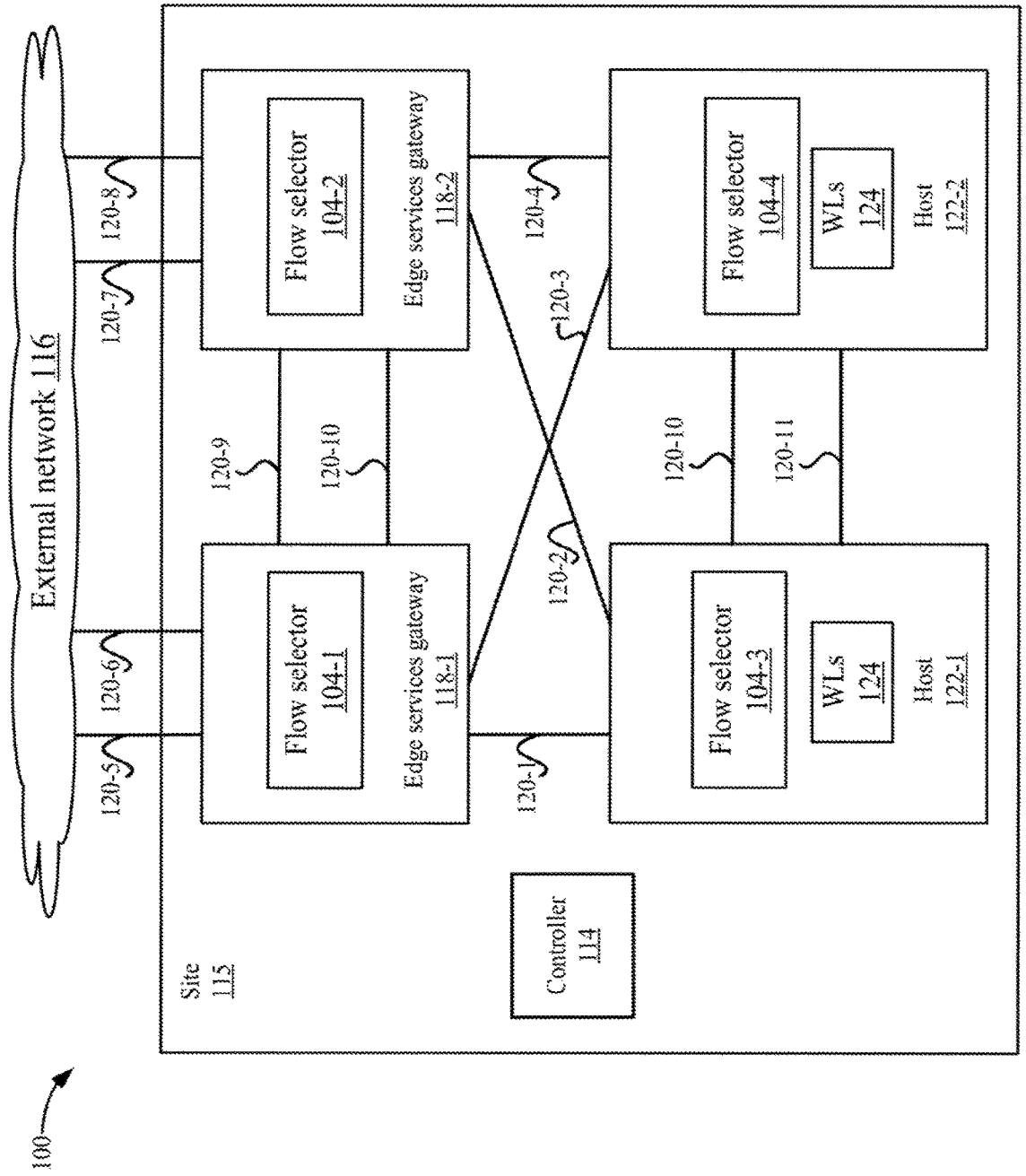
FIG. 1B depicts an example of a site according to some embodiments.

FIG. 1B depicts an example of a site 115 according to some embodiments. Site 115 may be a data center that includes edge services gateways 118-1 to 118-2 (collectively edge services gateway(s) 118), hosts 122-1 to 122-2 (collectively host(s) 122), and controller 114. It will be understood that different numbers of edge services gateways 118 and hosts 122 may be included in site 115.

Host 122, which comprises a physical computer system, such as a rack-mounted server, that in some implementations may run a hypervisor (not shown) and workloads 124. Workloads 124 may be running applications. Host 122 includes hardware resources including processor resources (not shown) memory resources (not shown) and input/output resources, including physical network interfaces ("PNICs"). Workloads may refer to virtual machines that are running on a respective host, but this is one example of a virtualized computing network resource or compute node. Any suitable technology may be used to provide a workload. A workload may be a virtual machine or a container (e.g., running on top of a guest operating system or a host operating system without the need for a hypervisor or separate operating system or implemented as an operating system level virtualization) or other similar technologies. In the case of a virtual machine, the workload may also be a complete computation environment containing virtual equivalents of the hardware and software components of a physical computing system. Also, as used herein, the term "hypervisor" may refer generally to a software layer or component that supports the execution of multiple workloads. Although a virtualized environment is described, some embodiments may be used in an environment that is not virtualized. Also, the term "workload" may refer to a host that is not virtualized.

An edge services gateway 118 may route traffic, which may be referred to as north/south traffic, from workloads 124 running on hosts 122 to an external network 116. Similarly, edge services gateway 118 may route traffic from external network 116 to workloads 124. Also, workloads 124 may send packets to other workloads 124 in site 102 (e.g., east-west traffic). Edge services gateway 118 may be implemented in different ways, such as in a workload running in a host, or on bare metal in a server. In some embodiments, edge services gateways 118 may perform various gateway operations (e.g., connecting logical overlay networks with devices on the physical underlay network or external networks, VPN services, and various other stateful or non-stateful edge services such as network address translation (NAT), dynamic host configuration protocol (DHCP), firewall, load balancing, and so forth.).

Edge services gateways 118 and hosts 122 may be able to send traffic through multiple links 120 to reach a destination. For example, edge services gateway 118-1 may use links 120-5 and 120-6 to reach a destination via external network 116 and edge services gateway 118-2 may use links 120-7 and 120-8 to reach a destination via external network 116. In some examples, different links may traverse different network devices, such as routers, to reach a destination. Edge services gateway 118-1 and edge services gateway 118-2 may also send traffic between themselves using links 120-9 and 120-10.

Hosts 122 may send traffic between each other on links 120-10 and 120-11. Further, host 122-1 may send traffic to external network 116 via links 120-1 and 120-2 to edge services gateway 118-1 and edge services gateway 120-2 and host 122-2 may send traffic via links 120-3 and 120-4 to edge services gateway 118-1 and edge services gateway 120-2. It is noted that load balancing may not be performed on all links 120. Also, although two links are described, more than two links may be used between entities.

When multiple links 120 can be used to reach the destination (e.g., through different routers), flow selector 104 may assign a flow to a link based on characteristics of the flow and the characteristics of flows currently assigned to the links. As discussed above, the flows may be classified as an elephant flow or a mice flow. Flow selector 104 may determine the classification for a flow (e.g., elephant or mice classification) before assigning the flow to a link 120. The following describes the link selection process in more detail.

Figure 2:
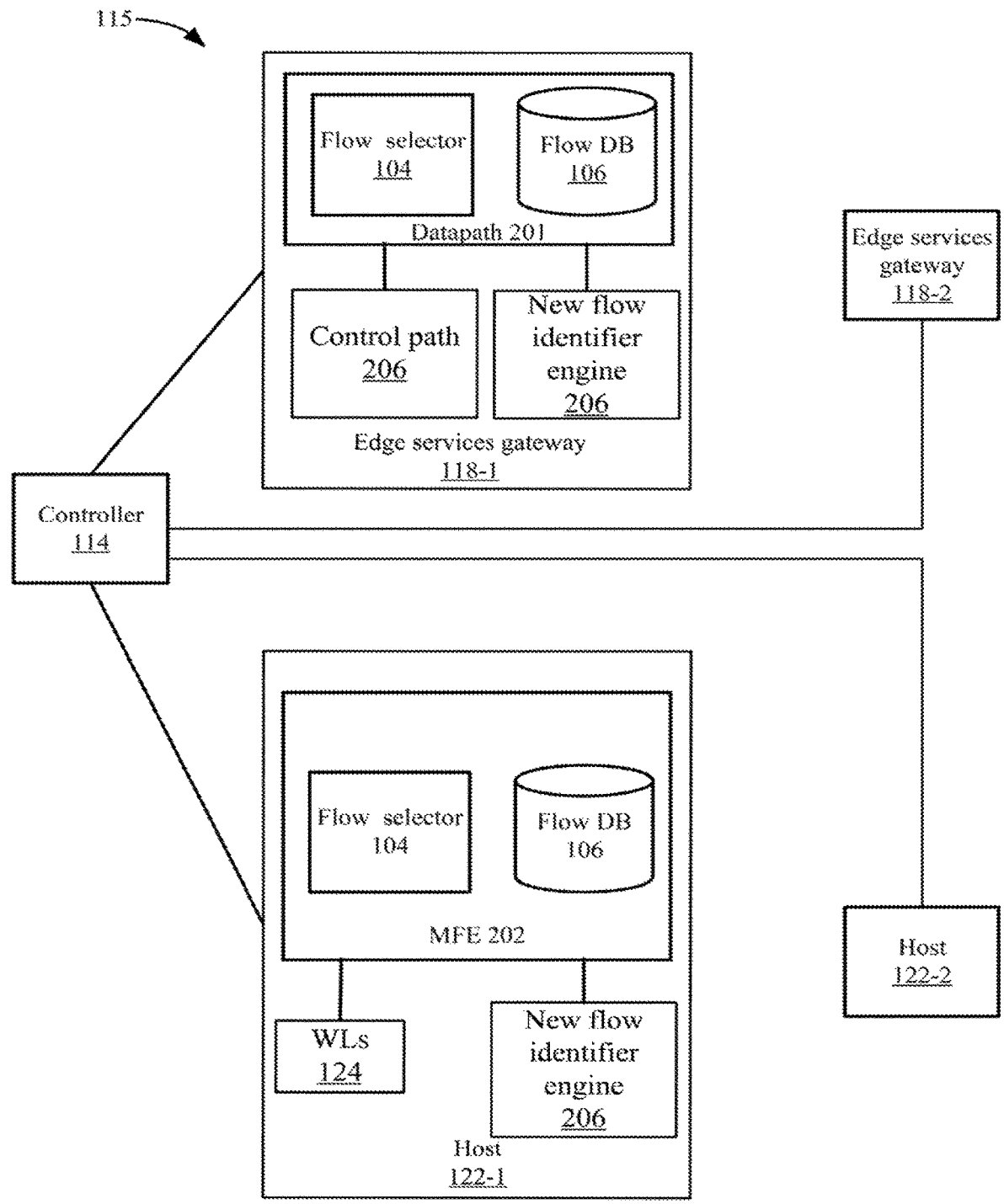
FIG. 2 depicts a more detailed example of the site to perform the flow selection process according to some embodiments.

FIG. 2 depicts a more detailed example of site 115 to perform the flow selection process according to some embodiments. FIG. 2 is simplified to show the details of one edge services gateway 118-1 and one host 122-1, but each edge services gateway 118-2 and host 122-2 may similarly perform the network resource selection process. Flow selector 104 is shown as a separate process from a new flow identifier engine 206. Although flow selector 104 and new flow identifier engine 206 are shown as separate processes or modules, functions performed by both may be combined or distributed in different ways. For example, flow selector 104 may perform the functions of new flow identifier workload 206, or vice versa. Flow selector 104 and new flow identifier engine 206 may be running within edge services gateway 118 or host 122, or may be running in separate devices.

In some embodiments, edge services gateways 118 are computing devices that may be bare metal machines executing a datapath 201 and/or computers on which workloads execute a datapath 201. These datapaths 201 may perform various gateway operations as described above to process packets being transmitted. Datapaths of 201 edge services gateway 118 may execute in conjunction with the primary operating system of a bare metal computing device and/or execute within a workload operating on a computing device. Edge services gateways 118 may also include a control path 206 that may program routes for routing packets to destinations via a next hop among other functions.

In some embodiments, hosts 122 may run managed forwarding elements (MFEs) 202 (e.g., in virtualization software of the host computers). Workloads 124 may run on the virtualization software also. MFE (or set of MFEs) 202 executing on the host at which a workload 124 resides performs logical network processing of packets. This may include sending packets to other hosts 112 when a destination is within site 115 or to edge services gateways 118 when a destination is external to site 115. MFEs 202 also send packets to workloads 124.

Flow selector 104 manages the identification of the classification for the flow. For example, flow selector 104 may use different methods to determine the classification for a flow, such as generating new flow classifications or using previously generated flow classifications. When a flow is first encountered, flow selector 104 may use a new flow identifier engine 206 to classify the flow as an elephant flow or a mice flow. In some embodiments, new flow identifier engine 206 is implemented or partially implemented within a workload, e.g., as an agent or daemon. In alternate embodiments (not shown), new flow identifier engine 206 may be located in other areas, such as in MFE 202 or datapath 201, or in other computing devices, such as separately from edge services gateway 118 and host 122.

New flow identifier engine 206 may classify the flow using a process that analyzes characteristics of the flow. For example, new flow identifier engine 206 may use a machine-learning process to classify the flow, which is described in more detail below. Once determining the classification, flow selector 104 may assign the new flow to a link 120 out of multiple links 120 that could be used to reach the destination.

Each host 122 and edge services gateway 118 may use previously generated specific flows and aggregated flows as discussed above. If flow database 106 includes a specific flow or aggregated flow that matches the flow, flow selector 104 may use the specific flow or the aggregated flow classifications to select a link 120. For example, instead of using new flow identifier engine 206 to classify a flow, flow selector 104 may use the classification of the specific flow in flow database 106 to perform to a select a link 120 out of multiple links 120 that could be used to reach the destination if there is a match of the source and the destination for a new flow and the specific flow. Similarly, flow selector 104 may use the aggregated flow in flow database 106 to select a link 120 for a new flow that has the same destination as the aggregated flow.

Flow selector 104 may select the link based on different processes. For example, flow selector 104 may select an uplink from multiple uplinks, where an uplink is a logical connection to one or more PNICs. Also, flow selector 104 may select a PNIC from multiple PNICs. The following will describe the scenarios.

Logical Routing

Figure 3A:
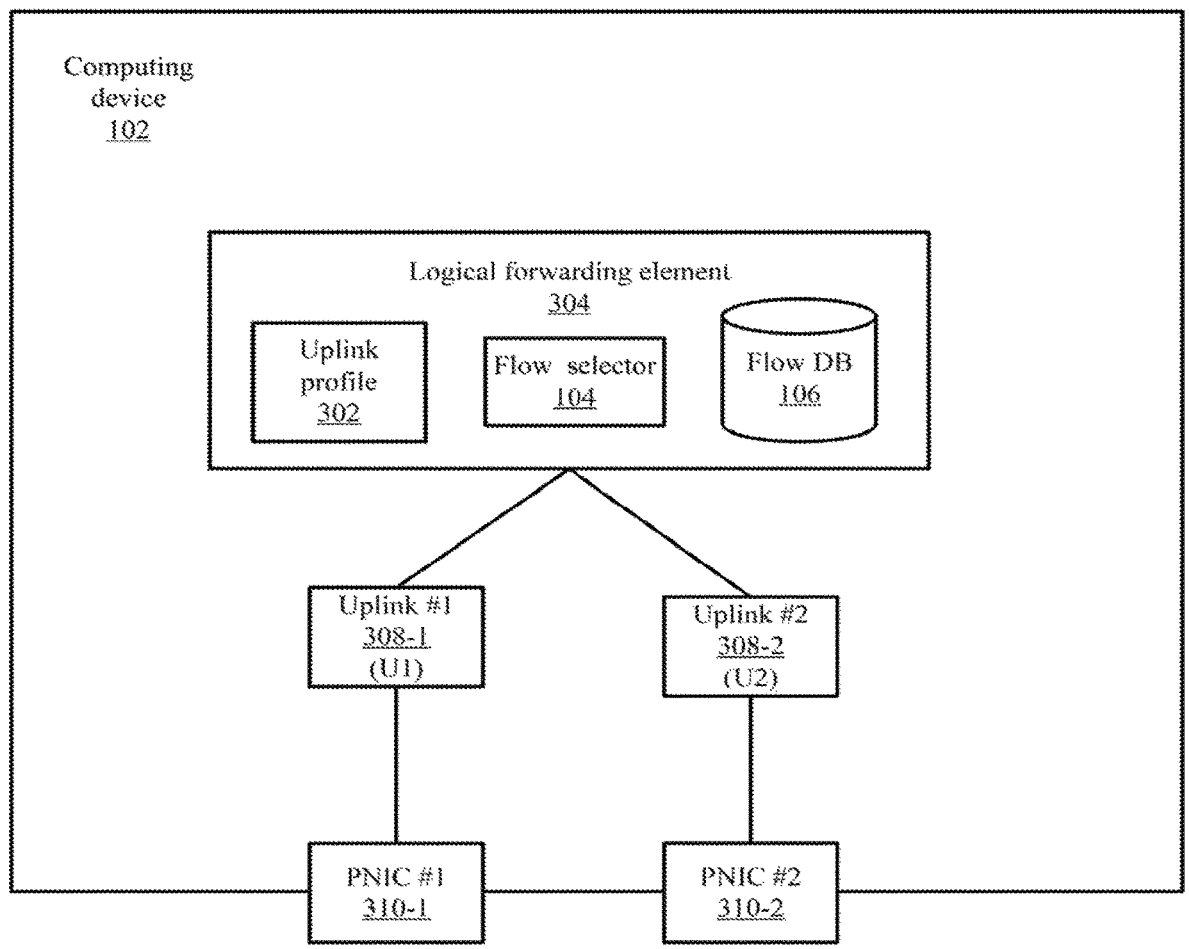
FIG. 3A depicts an example of flow selection at an edge services gateway or a host using uplinks according to some embodiments.

FIG. 3A depicts an example of flow selection at edge services gateway 118 or host 122 using uplinks 308 according to some embodiments. The description is described with respect to computing device 102, but may apply to edge services gateway 118 and/or hosts 122. Edge services gateway 118 and host 122 may select among network resources that, in this example, are uplinks. Each uplink may be a logical connection to a network. For example, an uplink may be associated with one or more PNICs, which are connected to a network (not shown).

Computing device 102 includes a logical forwarding element (LFE) 304 (e.g., logical switch or logical router). Examples of logical switches and logical routers may be found in U.S. Pat. No. 9,503,321, filed on Mar. 21, 2014 and U.S. Pat. No. 10,484,302, filed on Aug. 31, 2016, which claims priority to U.S. Provisional Application No. 62/380,411, filed on Aug. 27, 2016, all of which are incorporated by reference in their entirety. Computing device 102 includes an uplink profile 302 for defining the uplinks that are used for flow selection by flow selector 104. Although uplink profile 302 and flow selector 104 are shown in logical forwarding element 304, this is one possible implementation. In other implementations, any of these features may reside elsewhere within computing device 102, such as a privileged VM, an operating system, or in, or with the assistance of, hardware devices. When logical forwarding element 304 encounters a new flow, logical forwarding element 304 can determine which uplink (U1) 308-1 or uplink (U2) 308-2 to assign the flow. In this case, the destination can be reached via both uplinks 308. For example, the destination may be reached through a first next hop (e.g., a first router) via uplink 308-1 and a second next hop (e.g., a second router) via uplink 308-2.

Physical network interface cards (PNICs #1 to #2) 310-1 to 310-2 may each be an interface to connect computing device 102 to a physical link of a physical network (not shown). Uplink profile 302 may associate uplinks 308 with PNICs 310. In some examples, uplink #1 308-1 is associated with PNIC #1 310-1 and uplink #2 308-2 is associated with PNIC #2 310-2. Thus, when flow selector 104 selects uplink #1 308-1, the flow is assigned to PNIC #1 310-1 and when flow selector 104 selects uplink #2 308-2, the flow is assigned to PNIC #2 310-2. It is possible that an uplink may be assigned to multiple PNICs 310 in which case another process of flow selection among the multiple PNICs 310 is performed, which is described below.

In some examples, logical forwarding element 304 may look up the destination in a routing table for a packet being sent for a flow. The routing table may list the destination as having multiple next hops that are possible. For example, the destination may be reached via uplink #1 308-1 and uplink #2 308-2. Flow selector 104 may performed the weighted network resource selection as described herein to select one of uplink 308-1 and 308-2. For example, flow selector 104 may generate a classification for the flow and generate weights for uplink 308-1 and uplink 308-2 based on the classifications of flows already assigned to uplinks 308-1 and 308-2. Flow selector 104 selects one of uplinks 308-1 and 308-2 based on the classification of the new flow and the weights as described herein.

NIC Teaming Device

Figure 3B:
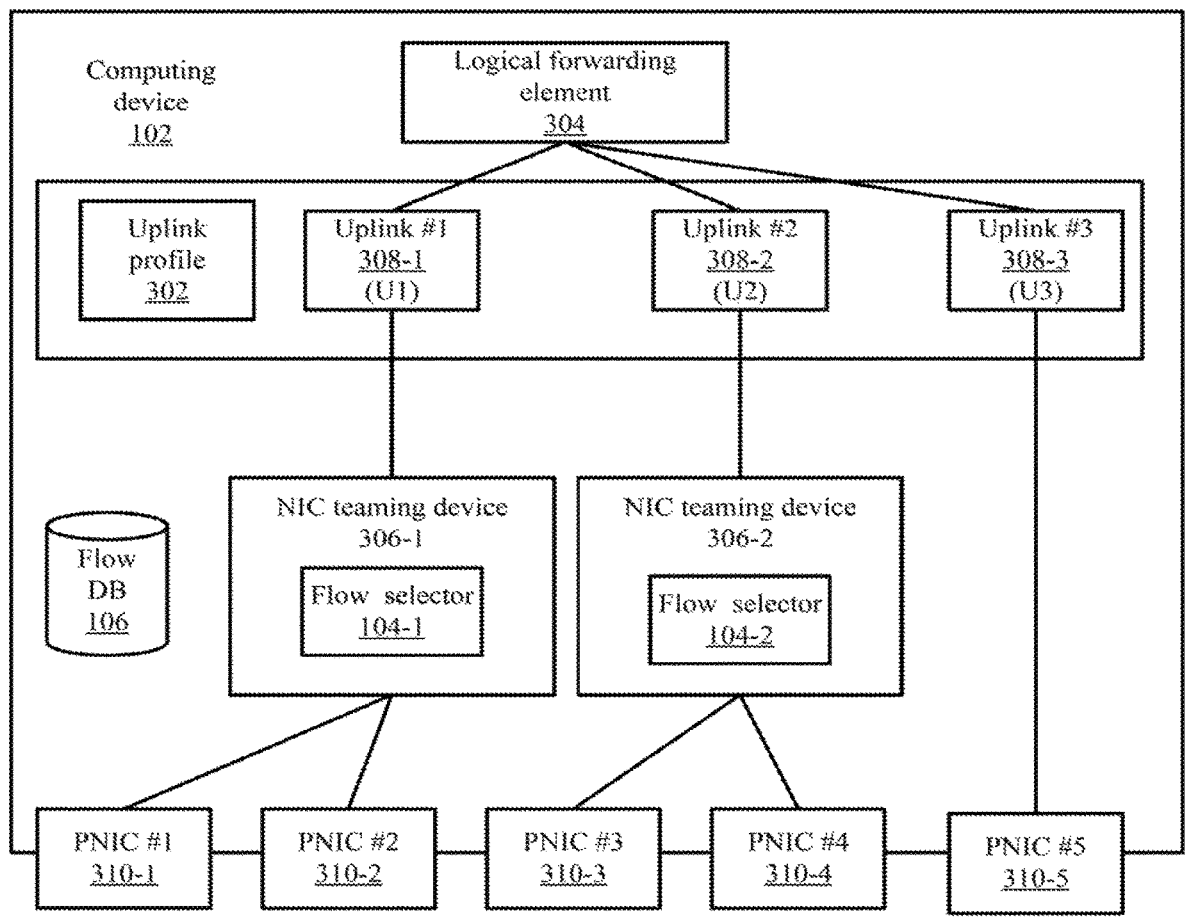
FIG. 3B depicts an example of computing device to select physical network interface cards (PNICs) for flow selection according to some embodiments.

In some embodiments, flow selector 104 may be used to assign a flow to PNICs 310. FIG. 3B depicts an example of computing device 102 to select PNICs 310 for flow selection according to some embodiments. Logical forwarding element 304 selects between uplinks 308 when assigning a flow to an uplink. Logical forwarding element 304 may or may not use a network resource of flow selector 104.

When an uplink 308 is associated with multiple PNICs 310 in uplink profile 302, a NIC teaming device 306, selects one of the PNICs 310 to process the flow. NIC teaming device 306 may be software, firmware, or hardware that is used to select one of the PNICs as described herein. An example of NIC teaming device 306 and the use of uplink profiles is described in U.S. Pat. No. 9,921,991 B2, filed Nov. 24, 2015, which is incorporated by reference in its entirety for all purposes. The destination can be reached via all PNICs associated with an uplink 308. In this example, uplink #1 308-1 is associated with PNIC #1 310-1 and PNIC #2 310-2; uplink #2 308-2 is associated with PNIC #3 310-3 and PNIC #4 310-4; and uplink #3 308-3 is associated with PNIC #5 310-5. Uplink #3 308-3 is in a 1:1 relationship with PNIC #5 310-5 and when uplink #3 is selected, PNIC 310-5 is used. However, when logical forwarding element 304 selects uplink 308-1 or uplink 308-2, then NIC teaming device 306-1 or 306-2 can select one of the associated PNICs.

In some examples, NIC teaming device 306 may receive a packet for a flow and select one of the PNICs to process the flow. For example, the destination may be reached via PNIC #1 310-1 and PNIC #2 310-2. Flow selector 104-1 may perform the network resource selection as described herein to select one of PNIC #1 310-1 and PNIC #2 310-2. For example, flow selector 104-1 may generate a classification for the flow and select one of PNIC #1 310-1 and PNIC #2 310-2 based on the classification of the flow and weights based on classifications of flows already assigned to PNIC #1 310-1 and PNIC #2 310-2. Further, flow selector 104-1 may use a specific flow or aggregated flow from flow database 106 to determine the classification for the new flow. NIC teaming device 306-2 may also perform a similar flow selection process using flow selector 104-2 and PNIC #3 310-3 and PNIC #4 310-4 when logical forwarding element 304 selects uplink 308-2.

Advanced Load Balancer

Figure 4:
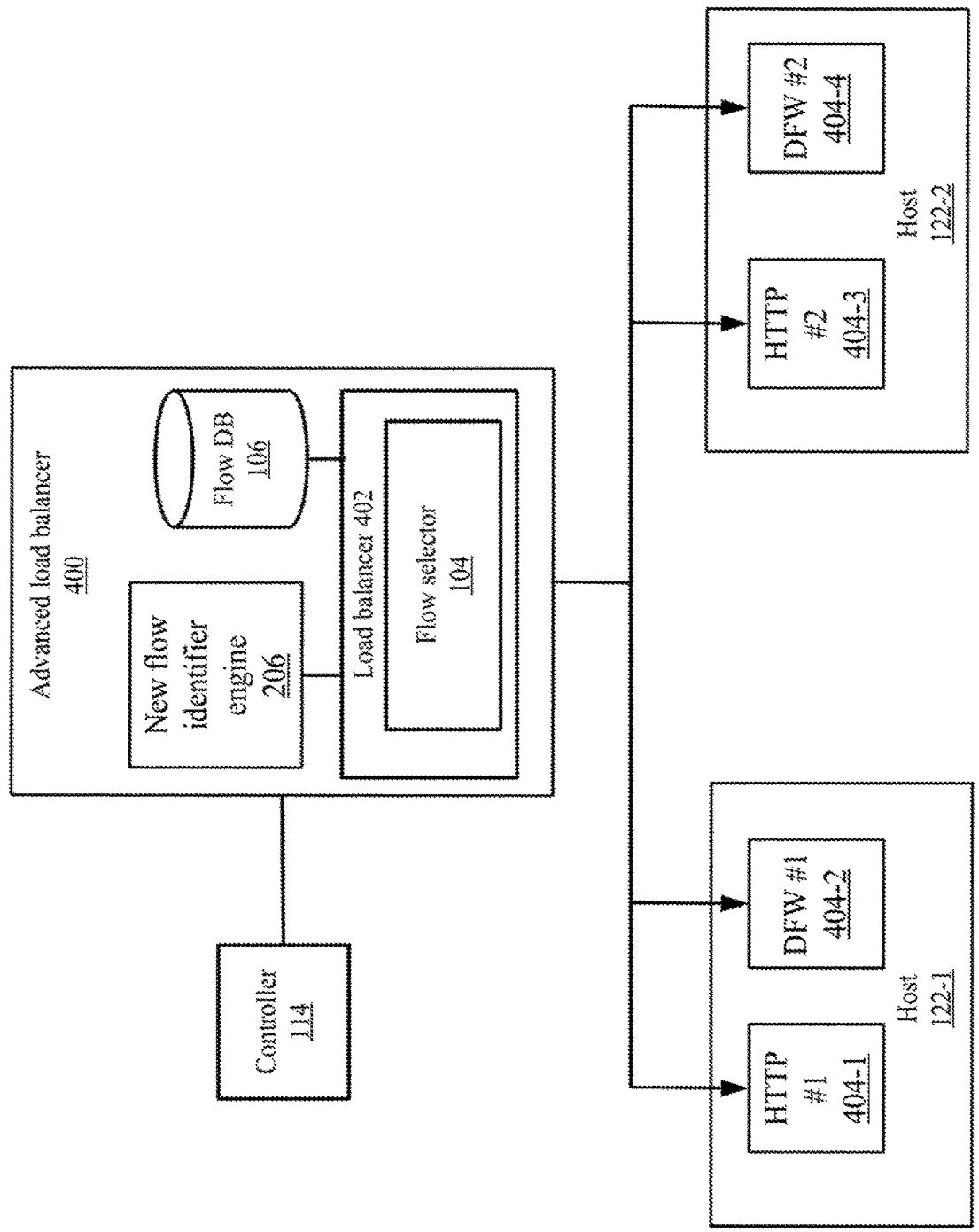
FIG. 4 depicts an example of an advanced load balancer according to some embodiments.

In some embodiments, flow selector 104 may be used to assign a flow to instances of services that can process a flow. FIG. 4 depicts an example of an advanced load balancer 400 according to some embodiments. Advanced load balancer 400 may perform load balancing among service instances 404. Services may be different services that are provided for processing packets of a flow, such as a web server (HTTP) service or distributed firewall service (DFW) service. Services may be associated in groups, such as web service instances are in one group and distributed firewall services are in another group.

Service instances 404 may be running on one or more hosts 122. For example, HTTP service #1 404-1 and DFW service #1 404-2 are running on a host 122-1 and HTTP services #2 404-3 and DFW service #2 404-4 are running on a host 122-2. The services may be running in workloads, but do not have to be. Also, the services may be running in separate workloads, or a single workload may be running multiple service instances.

Service instances 404 and hosts 122 may experience different loads. For example, hosts 122 may be running service instances 404 that are using more resources than other hosts, which may affect the processing of service instances 404 on that host 122 regardless of the service. Also, a service instance in a group may be experiencing a higher load than other service instances 404 in the same group. Load balancer 402 assigns flows to workloads 404 using the flow based weighted instance selection process.

Load balancer 402 may receive a new connection for a flow. Before assigning the flow to a service instance 404, load balancer 402 performs a flow selection process as described above. For example, flow selector 104 looks up the flow in flow database 106 to determine if the flow has been encountered before. If so, then load balancer 402 uses the previously determined classification to select a service instance. As discussed above, specific flows and aggregated flows may be used. If the flow has not been previously classified, new flow identifier engine 206 classifies the flow.

Once receiving the classification, load balancer 402 may select a service instance 404 to process the flow. If the flow is for a web server service, load balancer 402 assigns weights to the web server instances based on the classifications of flows already assigned to the network resource instances. Then, load balancer 402 selects a web server service based on the classification of the new flow. In some cases, load balancer 402 may avoid having a single network resource in a group from processing mostly elephant flows while another network resource processes mostly mice flows. In this case, the network resource processing elephant flows may be overloaded and delays in processing packets may result. Accordingly, load balancer 402 may distribute processing of elephant flows and mice flows across service instances in a group.

The following will describe the classification process in more detail. Any of the above examples may use the processes described.

Flow Classification

Figure 5:
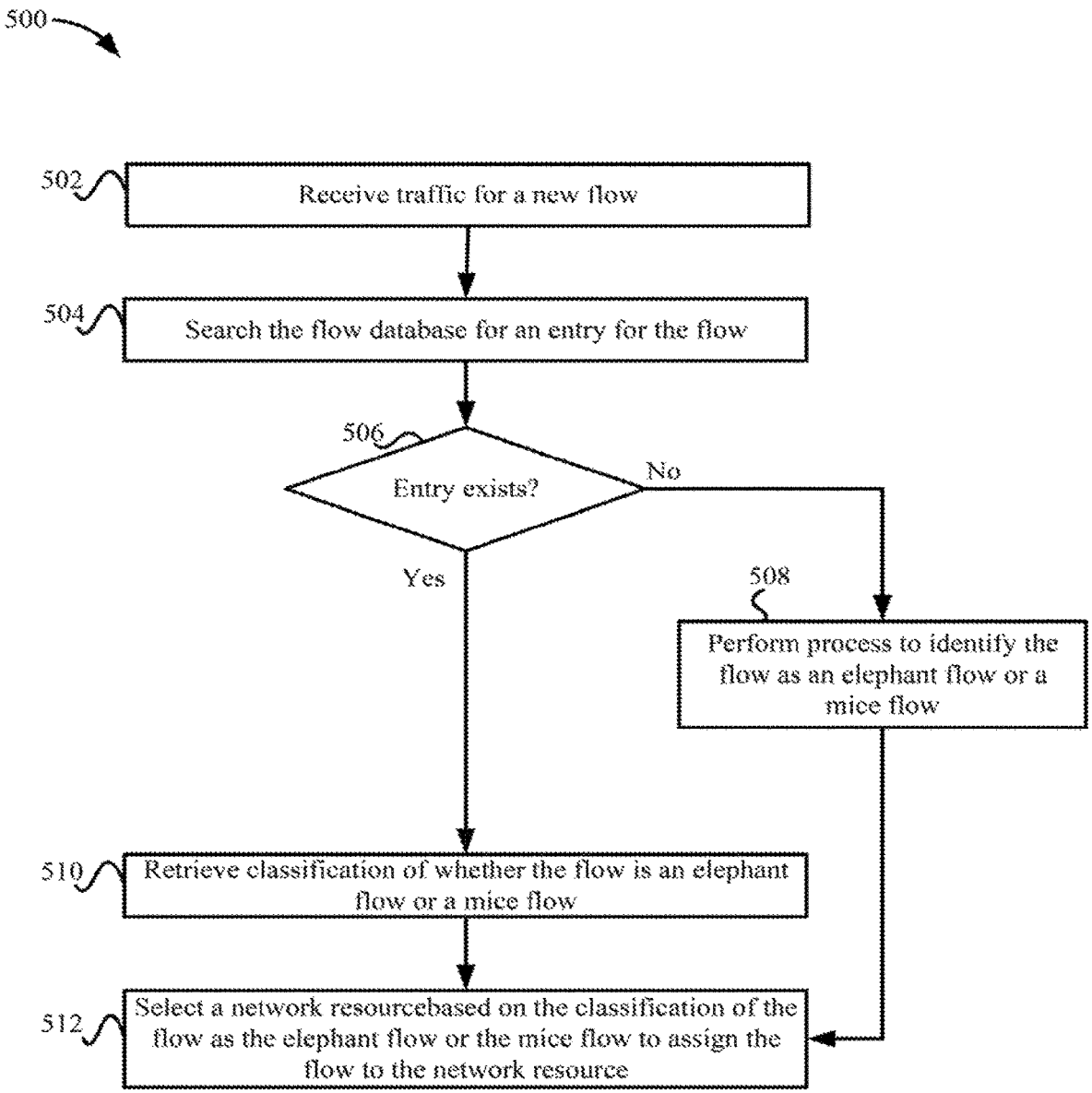
FIG. 5 depicts a simplified flowchart of a method for determining a classification for a new flow according to some embodiments.

FIG. 5 depicts a simplified flowchart 500 of a method for determining a classification for a new flow according to some embodiments. For example, a flow associated with a source and a destination is established.

At 502, flow selector 104 receives network traffic for a new flow. For example, one or more packets may be received for the new flow. Computing device 102 may buffer the packets while flow selector 104 determines a classification for the flow. Buffering may be performed because flow selector 104 waits for the classification to be determined to assign the flow to a network resource.

At 504, flow selector 104 searches flow database 106 for an entry for the flow. For example, flow selector 104 may use identification information for the flow to search for a matching flow in flow database 106. In some embodiments, the identification information may be a 5-tuple for the flow that identifies the source address, the destination address, the source port, the destination port, and the protocol for the flow. In this example, a match for a specific flow is discussed using a 5-tuple. Although a 5-tuple is described, other ways of searching for matching flows may be used, such as using more information to determine a match. Also, the possibility of using aggregated flows will be described in more detail below.

At 506, flow selector 104 determines whether an entry for the flow is included in flow database 106. When an entry is not included in flow database 106, at 508 new flow identifier engine 206 may perform a process to identify the flow as an elephant flow or a mice flow. As discussed above, new flow identifier engine 206 may be running in a workload. However, the functions performed by new flow identifier engine 206 may be performed by flow selector 104 or another entity. The generation of the classification will be described in more detail below.

If an entry exists in flow database 106, at 510, flow selector 104 retrieves the classification for the flow, which indicates whether the flow is an elephant flow or a mice flow. Upon determining the classification, either by generating the classification or retrieving the classification, at 512, flow selector 104 selects a network resource based on the classification of the flow as the elephant flow or the mice flow to assign the flow to the network resource. As will be discussed below, the load balancing may take into account the classification for the current flow and also the classifications for flows already placed on the network resources.

Machine Learning Classification Process

When a flow is not found in flow database 106, new flow identifier engine 206 may generate a classification for the flow. New flow identifier engine 206 may use different processes to classify a flow, such as a machine-learning process. The machine-learning process may perform the classification based on the dynamic behavior of the network rather than using statistical methods, such as counting the number of bytes being sent in a flow. The machine learning process may learn characteristics of the network dynamically, and can predict whether a new flow will be an elephant flow or a mice flow. Also, using machine-learning allows new flow identifier engine 206 to identify the classification of the flow before the flow is assigned to a network resource compared to having to count the number of bytes sent in packets for a flow that has already been assigned to the network resource.

Figure 6:
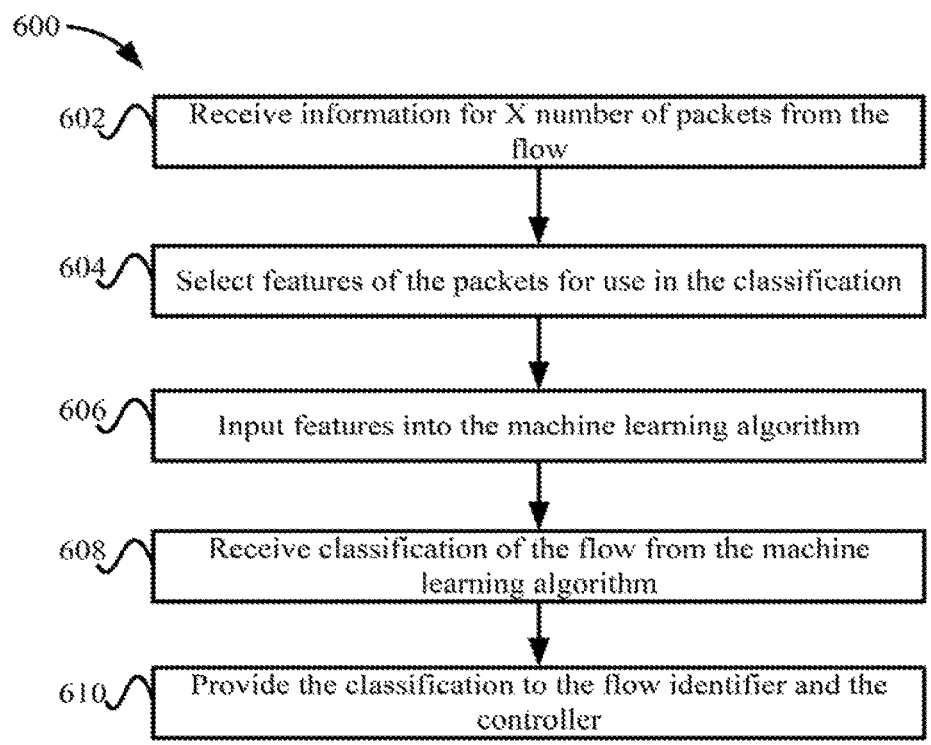
FIG. 6 depicts a simplified flowchart of a method for classifying a flow according to some embodiments.

FIG. 6 depicts a simplified flowchart 600 of a method for classifying a flow according to some embodiments. At 602, new flow identifier engine 206 receives characteristics for X number of packets from the flow. The X number of packets may be a small number of packets, such as three packets. The number of packets that is used to perform the classification may balance identifying the classification with more accurately versus having to buffer the packets for the flow before assigning the flow to a network resource. For example, using more packets may result in a more accurate prediction of a classification, but more packets must be buffered and not sent by computing device 102, which may cause latency in the connection.

New flow identifier engine 206 may use a machine-learning algorithm that may be trained to classify flow based on the X number of packets. At 604, new flow identifier engine 206 selects features of the packets for use in the classification. In some embodiments, certain features may be used to predict the classification for the flow. For example, one or more of the following features may be used:

1. Source Internet protocol (IP) address
2. Destination IP address
3. Source port
4. Destination port
5. Protocol (e.g., Transfer Control Protocol (TCP)/user datagram protocol (UDP)
6. Server/client identification (absent in the case of UDP packets)
7. Size of the first X number of packets (e.g., the first three packets)

In some embodiments, new flow identifier engine 206 may extract the features from the packet header of the packets. The source IP address may be the address used by a source device that sent the packet, the destination address may be the address of a destination device that should receive the packet, the source port is the port used by the source device, the destination port is the port used by the destination device, and the protocol is the protocol used to send the packets through the network. The server/client information may be used to detect the origin of the flow. This may verify the source of the flow. The size of the packets may be the size of a payload of the packet (or may also include the size of the packet header).

At 606, new flow identifier engine 206 inputs the features into the machine-learning algorithm. Different machine-learning algorithms may be used, such as regression and classification techniques. Neural networks, Gaussian processes, and Gaussian mixture models may be used to generate the classification, but other machine learning techniques may be used. The machine learning algorithm may be trained to output different values. For example, the machine-learning algorithm may output a value that classifies the flow as a mice flow or a second value that classifies the flow as an elephant flow. Also, in some embodiments, the machine-learning algorithm may output a prediction for the amount of data that will flow through the flow during its duration. New flow identifier engine 206 may then use the amount of data to determine whether the flow will be an elephant flow or a mice flow (such as by comparing the amount of data to a threshold). In some embodiments, when training the machine-learning algorithm, data sets may be used to analyze the first X packets of flows and train the machine-learning algorithm to output a classification based on the data set. A data set may include a number of flows that have been classified as elephant or mice flows. The features of the flows are then used to classify the flows. The parameters of the machine learning algorithm are then adjusted depending on whether the classification is correct or not. In some embodiments, the size of the first three packets may be indicative of whether or not the flow may be an elephant flow or a mice flow. For example, the machine learning algorithm may learn how size of the first three packets predicts whether the flow will be an elephant flow or a mice flow. Further, the machine learning algorithm learns whether the source and the destination of the flow may also be indicative of whether the flow may be an elephant flow or mice flow. For example, some sources or destinations may be associated with a type of flow, such as a video server may be associated with elephant flows typically. To capture the dynamic behavior of the network, the parameters of the machine learning algorithm may be constantly refined.

Once the machine learning algorithm outputs the classification, at 608, new flow identifier engine 206 receives the classification of the flow. Then, at 610, new flow identifier engine 206 provides the classification to flow selector 104 and controller 114. Flow selector 104 may then use the classification to assign the flow to a network resource. Also, controller 114 may use the classification to generate an aggregated flow.

Network Resource Selection

Figure 7:
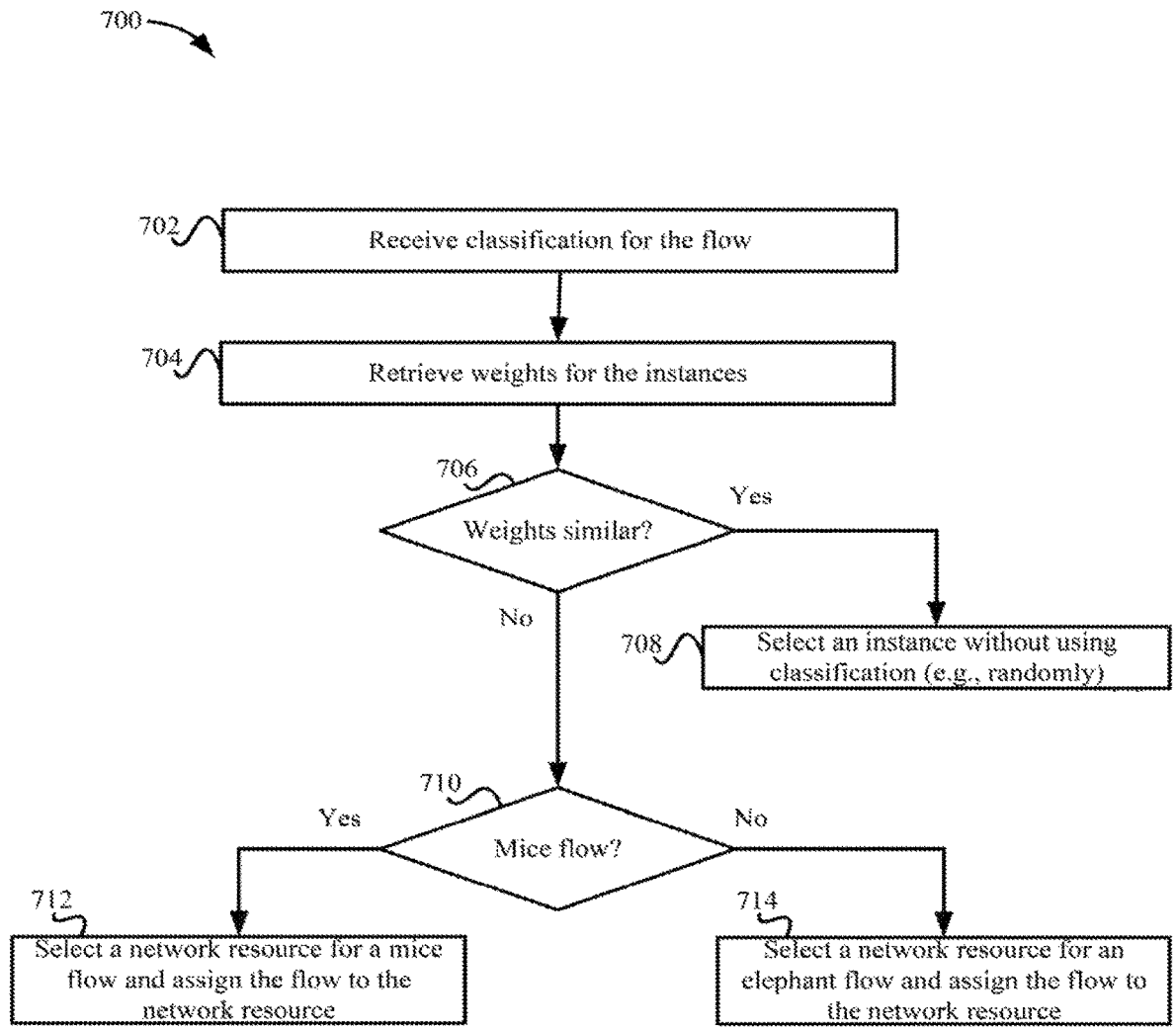
FIG. 7 depicts a simplified flowchart of a method for selecting a network resource according to some embodiments.

Once receiving the classification, flow selector 104 uses the classification to assign a network resource to the flow. FIG. 7 depicts a simplified flowchart 700 of a method for selecting a network resource according to some embodiments. At 702, flow selector 104 receives a classification for the flow.

Flow selector 104 then determines characteristics of the flows currently assigned to the network resources. The following will use a weighted system that weights the characteristics to quantify the number of elephant and mice flows that are assigned to a network resource. The weighted system may be discussed, but other systems may be used to value the characteristics of the flow. At 704, flow selector 104 retrieves weights for the network resource. In some embodiments, network resources may be weighted based on classifications of the flows assigned to the network resource. For example, when a network resource is assigned with an elephant flow, the weight for that network resource is increased by an assigned amount for an elephant flow, such as an elephant flow may increase the weight of a network resource by a number, such as a value of "2". When a network resource is assigned with a mice flow, the weight is increased by a different amount, such as by a weight of the value "1". Flow selector 104 aggregates the weights for a network resource based on the classifications for flows assigned to each respective network resource. In some examples, the following network resources may have current flows assigned of:

1. Network resource #1 includes two mice and one elephant flow.
2. Network resource #2 includes one mice flow and one elephant flow.
3. Network resource #3 includes two mice flows.

Using the above classifications, flow selector 104 determines the weights of the network resource as:

1. Network resource #1 includes a weight of four.
2. Network resource #2 includes a weight of three.
3. Network resource #3 includes a weight of two.

In the above, network resource #1 includes two mice flows and one elephant flow, which equals a weight of "2" for the two mice flows and a weight of "2" for the one elephant flow for a total of "4". Network resource #2 includes one mice flow and one elephant flow, which equals a weight of "1" for the mice flow and a weight of "2" for the elephant flow for a total of 3. Network resource #3 includes two mice flows, which each include a weight of "1", for a total of "2".

Flow selector 104 then assigns the flow to a network resource based on the weights. At 706, flow selector 104 determines if the weights for the network resources are similar. The determination of the similarity may require that the weights are exactly the same. However, a threshold may be used, such as determining whether the weights are within a certain value, such as within a range of two units. That is, a weight of five and a weight of six for a flow may indicate that the weights are similar for those flows.

If the weights are similar, then at 708, flow selector 104 may select a network resource without using a classification. For example, flow selector 104 may select a network resource randomly or based on a value of the tuple for the flow (e.g., a hash value of the tuple for the flow). Flow selector 104 may use the random selection because the weights are similar and thus placing the new flow on any of the network resources may have a similar effect on network congestion. Other methods may be used, such as placing the flow on a network resource that has not had a flow placed on it for the longest amount of time.

If the weights are not similar, then flow selector 104 uses the classification to place the flow on a network resource. For example, at 710, flow selector 104 determines whether the flow is a mice flow. If the flow is a mice flow, at 712, flow selector 104 selects a network resource for a mice flow and assigns the flow to the network resource. For example, flow selector 104 selects a network resource with the second largest weight. In some embodiments, flow selector 104 uses the network resource with the second largest weight because the mice flow may not transfer a large amount of data and can be placed on a network resource that is more congested. However, the network resource with the second largest weight is used instead of the network resource with the highest weight because the highest weight may be more likely to be congested. However, it will be understood that flow selector 104 may place mice flows on other network resources, such as network resources with lower weights if latency is important for the mice flow and a less congested link is desired. Also, flow selector 104 may want to leave the network resources with lower weights for assignment of elephant flows. Although the second largest weight is described, other methods may be used, such as placing the flow on the network resource with the largest weight or third largest weight, etc. However, flow selector 104 may select a network resource that has a higher weight than a flow that would be selected if the flow is an elephant flow.

If the flow is an elephant flow, at 714, flow selector 104 selects a network resource for an elephant flow and assigns the flow to the network resource. For example, flow selector 104 selects the network resource with the least weight. Flow selector 104 uses the network resource with the least weight because the elephant flow may be expected to transfer a large amount of data throughout the life of the flow, which may be a long duration (e.g., minutes or hours). The network resource with the least amount of data may be expected to have the least network congestion at the present time and also maybe during the duration of the flow. Accordingly, placing the elephant flow on this network resource may balance the network congestion on the network resources more efficiently. Although the least weight is described, other methods may be used, such as placing the flow on the network resource with the second least weight, etc. However, flow selector 104 may select a network resource that has a lower weight than a flow that would be selected if the flow is a mice flow.

Flow Aggregation

As mentioned above, flow selector 104 may use an aggregated flow if a specific flow is not found in flow database 106. Once new flow identifier engine 206 identifies a specific flow, such as from a source to a destination, new flow identifier engine 206 sends the information for the flow to controller 114. Controller 114 can collect flow-specific information from multiple nodes and generate an aggregated flow when appropriate.

Aggregation engine 210 may aggregate the flows based on a 3-tuple. For example, aggregation engine 110 may determine flows that include the same destination IP address, destination port, and protocol. If the flows have the same classification, then aggregation engine 110 may generate an aggregated flow with the classification. For example, aggregation engine 110 may generate an aggregate flow if a number of flows include the same destination information and classification. Aggregation engine 210 may also use other processes, such as a value that is increased when a destination is classified as an elephant flow and decreased when a destination is classified as a mice flow. When the weight goes above a threshold, aggregation engine 110 may generate an aggregated flow. Also, when the weight goes below a threshold, then aggregation engine 110 may remove the aggregated flow. For example, the weight of ten may be used to generate an aggregated flow and a weight of five is used to remove the aggregated flow. Other methods may also be used.

Aggregation engine 110 may send the aggregated flow information (e.g., aggregate flow identification and aggregated classification) back to computing devices 102. Computing devices 102 may then store the aggregated flow information in flow database 106. Flow selector 104 can then use the aggregated flow information to perform load balancing.

Figure 8:
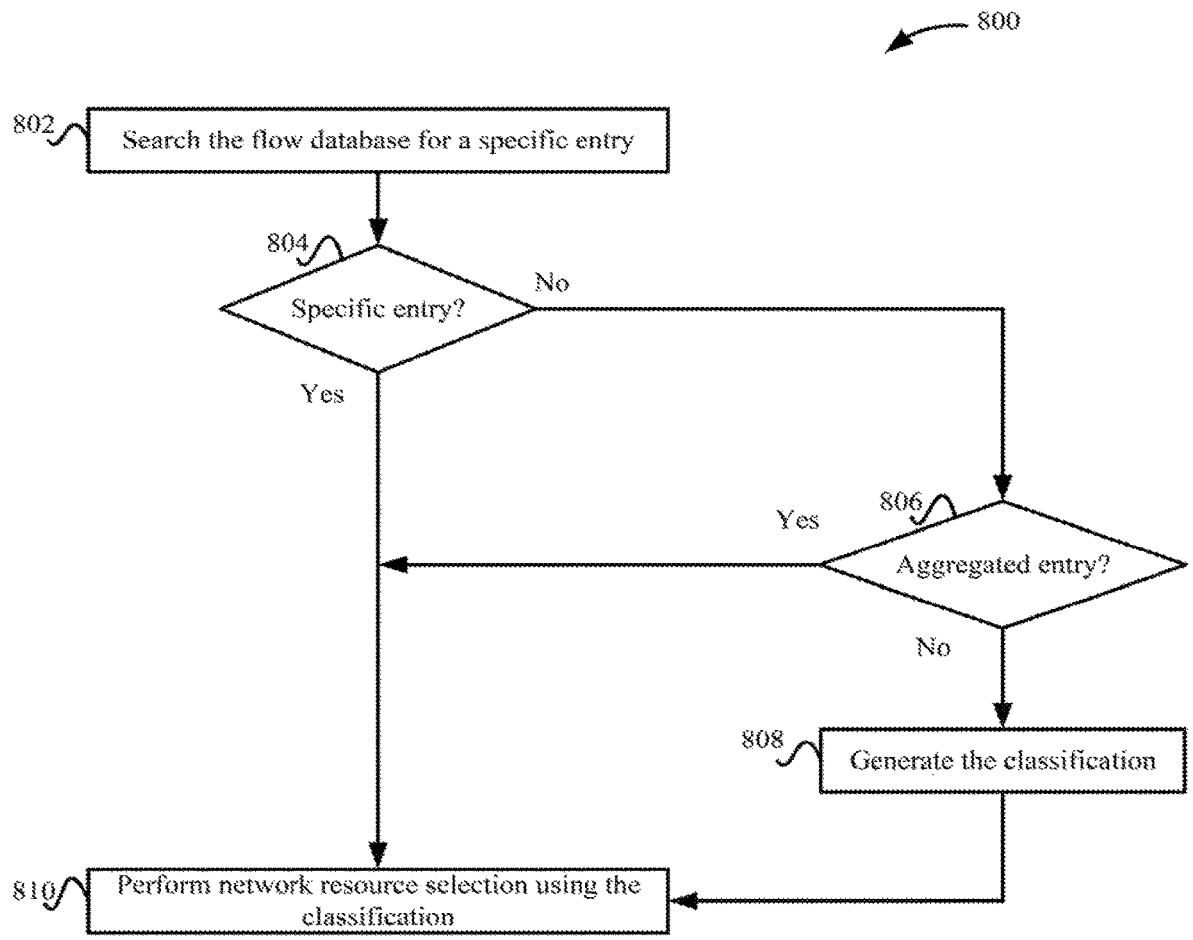
FIG. 8 depicts a simplified flowchart of a method for using the aggregated flows according to some embodiments.

When initially looking for a classification for a flow, flow selector 104 can search flow database for a specific entry or aggregated entry. FIG. 8 depicts a simplified flowchart 800 of a method for using the aggregated flows according to some embodiments. At 802, flow selector 104 searches flow database 106 for a specific entry for a specific flow. As discussed above, the specific entry may be identified by a 5-tuple. At 804, flow selector 104 determines whether a specific entry for the specific flow exists. If not, at 806, flow selector 104 determines if flow database 106 includes an aggregated entry for an aggregated flow. As discussed above, the specific entry may be identified by a 3-tuple. If an aggregated entry for an aggregated flow does not exist, then at 808, new flow identifier engine 206 generates the classification as discussed above. At this point, flow selector 104 has determined an aggregated entry, a specific entry, or generated a classification. Then, at 810, flow selector 104 performs network resource selection using the classification as described above.

The aggregated flow may be a 3-tuple where the source address will not be considered. An aggregated flow matches as long as the destination IP address, the destination port, and protocol matches the current flow. The aggregation is useful for flows that have already been identified as elephant flows or mice flows because most flows for a given destination IP address and a destination port may usually be from the same type of application that is accessing the destination (e.g., server). For example, multiple sources may be accessing the server in the same way. Only in rare cases is the nature of the traffic different for different sources. For example, if a video streaming server is being accessed by different sources, the nature of the traffic flowing through all the flows may be similar. Accordingly, if a new source is attempting to access the same destination, the aggregated flow may be an accurate classification for the new flow. Flow selector 104 can determine the classification for the flow without any delay in determining the classification using new flow identifier engine 206.

In some embodiments, after using the classification after finding a specific entry or aggregated entry, new flow identifier engine 206 may re-check the classification by running the machine-learning algorithm on the flow. For example, new flow identifier engine 206 may use the features of the flow to re-classify the flow. The re-classification may be used to determine whether any conditions have changed, which may cause a flow to change from an elephant flow to a mice flow, or from a mice flow to an elephant flow. In some embodiments, new flow identifier engine 206 may determine that the classification is different. In this case, flow selector 104 may have already assigned the flow on a network resource. However, computing device 102 may invalidate the specific entry or the aggregated entry in flow database 106. Also, computing device 102 may notify controller 114 of the different classification for the specific flow or the aggregated flow.

Migration of Flows

A workload that is the source of the flow may be migrated to another computing device 102. In this case, information for the flows can be sent to the new computing device 102. In some embodiments, information from flow database 106, such as the specific flows, may be sent to controller 114, which can then send the specific flows to the new host. In this case, since the new host can store the specific flows, and the new host does not need to identify classifications for the specific flows after the workload has migrated to the new host. For example, for any existing flow, the new host has the classification to use to assign the flow to a network resource. Also, for any new flow that matches the migrated flows, the new host would not have to determine the classification.

Network Resource Failure

When a network resource fails, all the flows that have been assigned to the network resource are re-assigned to other network resources. When the failed network resource comes back up, flow selector 104 may not re-assign the existing flows from other network resources back to the new network resource. This would disturb the existing flows on the other network resources. Rather, flow selector 104 may initialize the weight of the network resource that came back up with a new weight, such as zero. Then, using the weighted network resource selection process, flow selector 104 would assign new flows to the network resource that came back up based on the new network resource having the lowest weight. It is expected that more flows will be assigned to the network resource that just came back up based on the network resource selection process because of the network resource's low weight value.

CONCLUSION

Accordingly, flow selector 104 may use the classification to efficiently assign flows to network resources. Using the machine-learning algorithm and aggregated flows, flow selector 104 may assign flows using the classification. Using the machine-learning may allow a small number of packets to be buffered while the flow is classified. This may improve the assignment of flows to network resources compared to assigning a flow to a network resource and then classifying the flow as network traffic flows through the flow. The reduction of network congestion in specific network resources may reduce the average flow completion time for elephant flows while keeping the average flow completion time for mice flows roughly the same.

Many variations, modifications, additions, and improvements are possible, regardless the degree of virtualization. The virtualization software can therefore include components of a host, console, or guest operating system that performs virtualization functions. Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components.

Some embodiments described herein can employ various computer-implemented operations involving data stored in computer systems. For example, these operations can require physical manipulation of physical quantities—usually, though not necessarily, these quantities take the form of electrical or magnetic signals, where they (or representations of them) are capable of being stored, transferred, combined, compared, or otherwise manipulated. Such manipulations are often referred to in terms such as producing, identifying, determining, comparing, etc. Any operations described herein that form part of one or more embodiments can be useful machine operations.

Further, one or more embodiments can relate to a device or an apparatus for performing the foregoing operations. The apparatus can be specially constructed for specific required purposes, or it can be a general purpose computer system selectively activated or configured by program code stored in the computer system. In particular, various general purpose machines may be used with computer programs written in accordance with the teachings herein, or it may be more convenient to construct a more specialized apparatus to perform the required operations. The various embodiments described herein can be practiced with other computer system configurations including handheld devices, microprocessor systems, microprocessor-based or programmable consumer electronics, minicomputers, mainframe computers, and the like.

Yet further, one or more embodiments can be implemented as one or more computer programs or as one or more computer program modules embodied in one or more non-transitory computer readable storage media. The term non-transitory computer readable storage medium refers to any data storage device that can store data which can thereafter be input to a computer system. The non-transitory computer readable media may be based on any existing or subsequently developed technology for embodying computer programs in a manner that enables them to be read by a computer system. Examples of non-transitory computer readable media include a hard drive, network attached storage (NAS), read-only memory, random-access memory, flash-based nonvolatile memory (e.g., a flash memory card or a solid state disk), a CD (Compact Disc) (e.g., CD-ROM, CD-R, CD-RW, etc.), a DVD (Digital Versatile Disc), a magnetic tape, and other optical and non-optical data storage devices. The non-transitory computer readable media can also be distributed over a network coupled computer system so that the computer readable code is stored and executed in a distributed fashion.

Finally, boundaries between various components, operations, and data stores are somewhat arbitrary, and particular operations are illustrated in the context of specific illustrative configurations. Other allocations of functionality are envisioned and may fall within the scope of embodiments. In general, structures and functionality presented as separate components in exemplary configurations can be implemented as a combined structure or component. Similarly, structures and functionality presented as a single component can be implemented as separate components.

These and other variations, modifications, additions, and improvements may fall within the scope of the appended claims(s). As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments of the present disclosure along with examples of how aspects of the present disclosure may be implemented. The above examples and embodiments should not be deemed to be the only embodiments, and are presented to illustrate the flexibility and advantages of the present disclosure as defined by the following claims. Based on the above disclosure and the following claims, other arrangements, embodiments, implementations and equivalents may be employed without departing from the scope of the disclosure as defined by the claims.

What is claimed is:

1. A method comprising:
    receiving, by a flow selector of a virtualized network resource, a set of packets for a flow, the virtualized network resource running in a workload supported by virtualization software on a host computer;
    determining, by a flow identifier engine of the virtualized network resource, a set of features for the flow from the set of packets;
    selecting, by the flow selector, a classification of an elephant flow or a mice flow based on the set of features, wherein the classification is selected before assigning the flow to a network resource in a plurality of network resources;
    assigning, by the flow, selector, the flow to a network resource in the plurality of network resources based on the classification for the flow and a set of classifications for flows currently assigned to the plurality of network resources; and
    sending the set of packets for the flow using the assigned network resource.

2. The method of claim 1, wherein selecting the classification comprises:
    receiving the classification from a machine learning process, wherein the machine learning process generates the classification based on the set of features of the flow.

3. The method of claim 1, wherein assigning the flow to the network resource comprises:
    determining a weight for each of the plurality of network resources, wherein the weight for a network resource is based on the classifications of elephant flows and mice flows for the flows currently assigned to a respective network resource; and
    selecting a network resource from the plurality of network resources based on the classification for the flow of the elephant flow or the mice flow and the weight for each of the plurality of network resources.

4. The method of claim 3, wherein the plurality of network resources comprises one or more of the following:
    a plurality of links;
    a plurality of uplinks;
    a plurality of physical network interface cards; or
    a plurality of service network resources.

5. The method of claim 1, wherein the workload comprises:
- a virtual machine (VM) supported by a hypervisor, the virtualization software comprising the hypervisor; or
- a container, the virtualization software implementing operating system level virtualization.

6. The method of claim 1, wherein the virtualized network resource comprises:
- an edge services gateway;
- a managed forwarding element; or
- a logical forwarding element.

7. The method of claim 1, wherein selecting the classification comprises:
- searching a database for a specific entry that includes destination information for a destination of the flow and source information for a source of the flow;
- when the database does not include a specific entry, searching the database for an aggregated entry that includes the destination information for a destination of the flow.

8. A non-transitory computer-readable storage medium storing instructions executable by one or more processors to cause a computing system to perform operations comprising:
- receiving, by a flow selector of a virtualized network resource, a set of packets for a flow, the virtualized network resource running in a workload supported by virtualization software on a host computer;
- determining, by a flow identifier engine of the virtualized network resource, a set of features for the flow from the set of packets;
- selecting, by the flow selector, a classification of an elephant flow or a mice flow based on the set of features, wherein the classification is selected before assigning the flow to a network resource in a plurality of network resources;
- assigning, by the flow, selector, the flow to a network resource in the plurality of network resources based on the classification for the flow and a set of classifications for flows currently assigned to the plurality of network resources; and
- sending the set of packets for the flow using the assigned network resource.

9. The non-transitory computer-readable storage medium of claim 8, wherein selecting the classification comprises:
- receiving the classification from a machine learning process, wherein the machine learning process generates the classification based on the set of features of the flow.

10. The non-transitory computer-readable storage medium of claim 8, wherein assigning the flow to the network resource comprises:
- determining a weight for each of the plurality of network resources, wherein the weight for a network resource is based on the classifications of elephant flows and mice flows for the flows currently assigned to a respective network resource; and
- selecting a network resource from the plurality of network resources based on the classification for the flow of the elephant flow or the mice flow and the weight for each of the plurality of network resources.

11. The non-transitory computer-readable storage medium of claim 10, wherein the plurality of network resources comprises one or more of the following:
- a plurality of links;
- a plurality of uplinks;
- a plurality of physical network interface cards; or
- a plurality of service network resources.

12. The non-transitory computer-readable storage medium of claim 8, wherein the workload comprises:
- a virtual machine (VM) supported by a hypervisor, the virtualization software comprising the hypervisor; or
- a container, the virtualization software implementing operating system level virtualization.

13. The non-transitory computer-readable storage medium of claim 8, wherein the virtualized network resource comprises:
- an edge services gateway;
- a managed forwarding element; or
- a logical forwarding element.

14. The non-transitory computer-readable storage medium of claim 8, wherein selecting the classification comprises:
- searching a database for a specific entry that includes destination information for a destination of the flow and source information for a source of the flow;
- when the database does not include a specific entry, searching the database for an aggregated entry that includes the destination information for a destination of the flow.

15. A computing system, comprising:
- one or more computer processors; and
- a non-transitory computer-readable storage medium storing instructions executable by one or more processors to cause the computing system to perform operations comprising:
  - receiving, by a flow selector of a virtualized network resource, a set of packets for a flow, the virtualized network resource running in a workload supported by virtualization software on a host computer;
  - determining, by a flow identifier engine of the virtualized network resource, a set of features for the flow from the set of packets;
  - selecting, by the flow selector, a classification of an elephant flow or a mice flow based on the set of features, wherein the classification is selected before assigning the flow to a network resource in a plurality of network resources;
  - assigning, by the flow, selector, the flow to a network resource in the plurality of network resources based on the classification for the flow and a set of classifications for flows currently assigned to the plurality of network resources; and
  - sending the set of packets for the flow using the assigned network resource.

16. The computing system of claim 15, wherein selecting the classification comprises:
- receiving the classification from a machine learning process, wherein the machine learning process generates the classification based on the set of features of the flow.

17. The computing system of claim 15, wherein assigning the flow to the network resource comprises:
- determining a weight for each of the plurality of network resources, wherein the weight for a network resource is based on the classifications of elephant flows and mice flows for the flows currently assigned to a respective network resource; and
- selecting a network resource from the plurality of network resources based on the classification for the flow of the elephant flow or the mice flow and the weight for each of the plurality of network resources.

18. The computing system of claim 17, wherein the plurality of network resources comprises one or more of the following:
- a plurality of links;
- a plurality of uplinks;
- a plurality of physical network interface cards; or
- a plurality of service network resources.

19. The computing system of claim 15, wherein the workload comprises:
- a virtual machine (VM) supported by a hypervisor, the virtualization software comprising the hypervisor; or
- a container, the virtualization software implementing operating system level virtualization.

20. The computing system of claim 15, wherein the virtualized network resource comprises:
- an edge services gateway;
- a managed forwarding element; or
- a logical forwarding element.

* * * * *